J. C. FRENCH.
TRENCH MACHINE.
APPLICATION FILED AUG. 23, 1915.
1,285,108.
Patented Nov. 19, 1918.
5 SHEETS—SHEET 4.
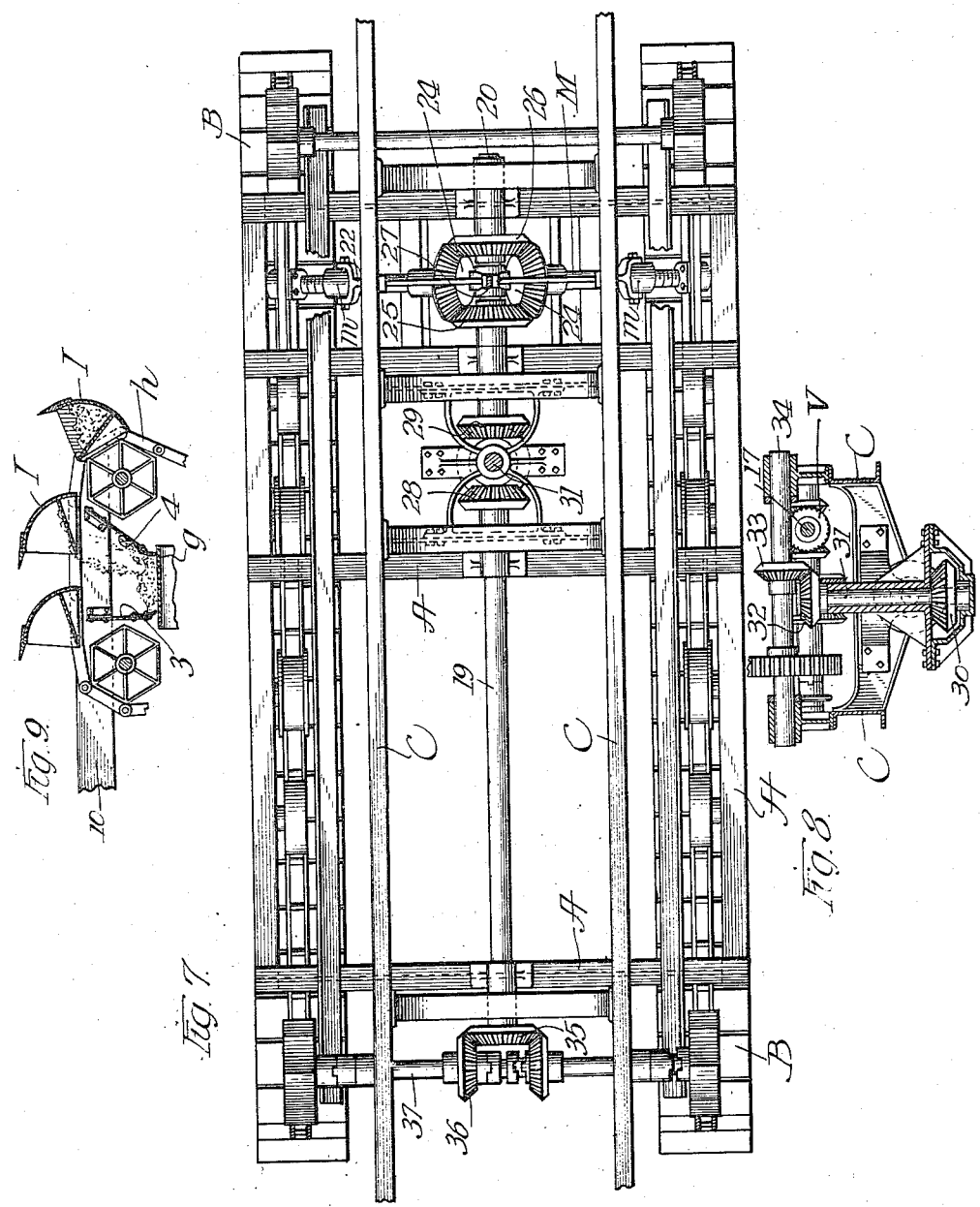

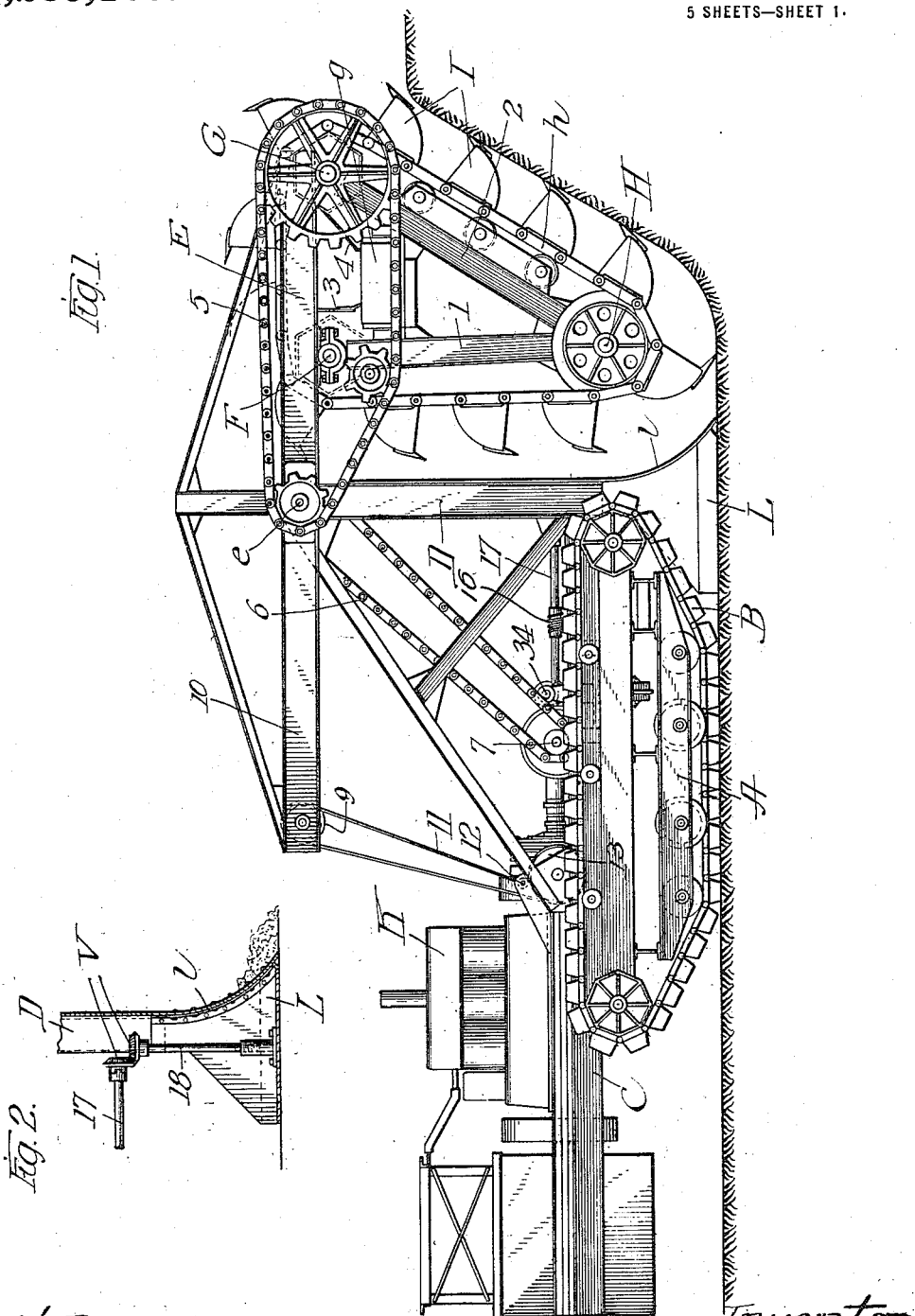

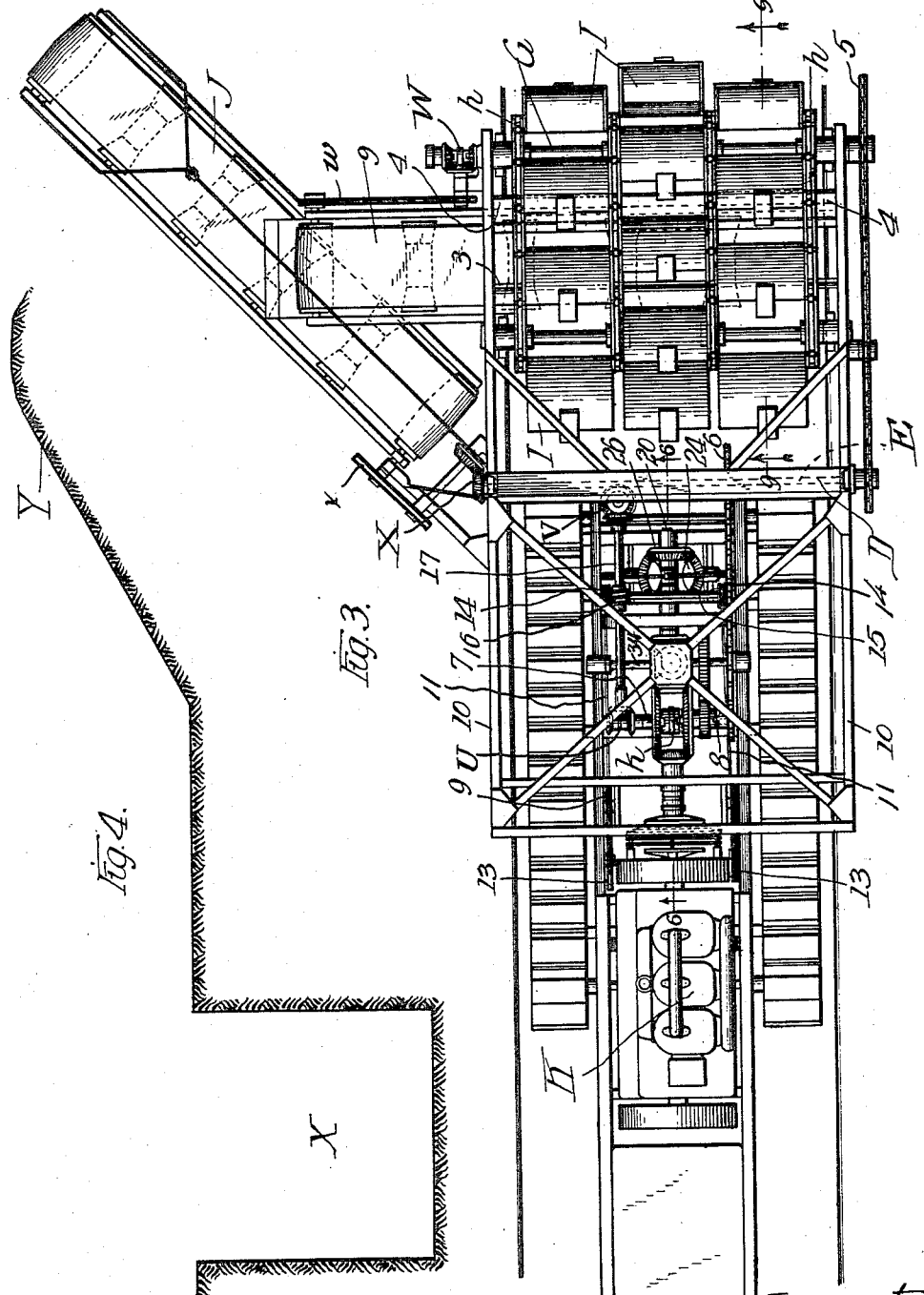

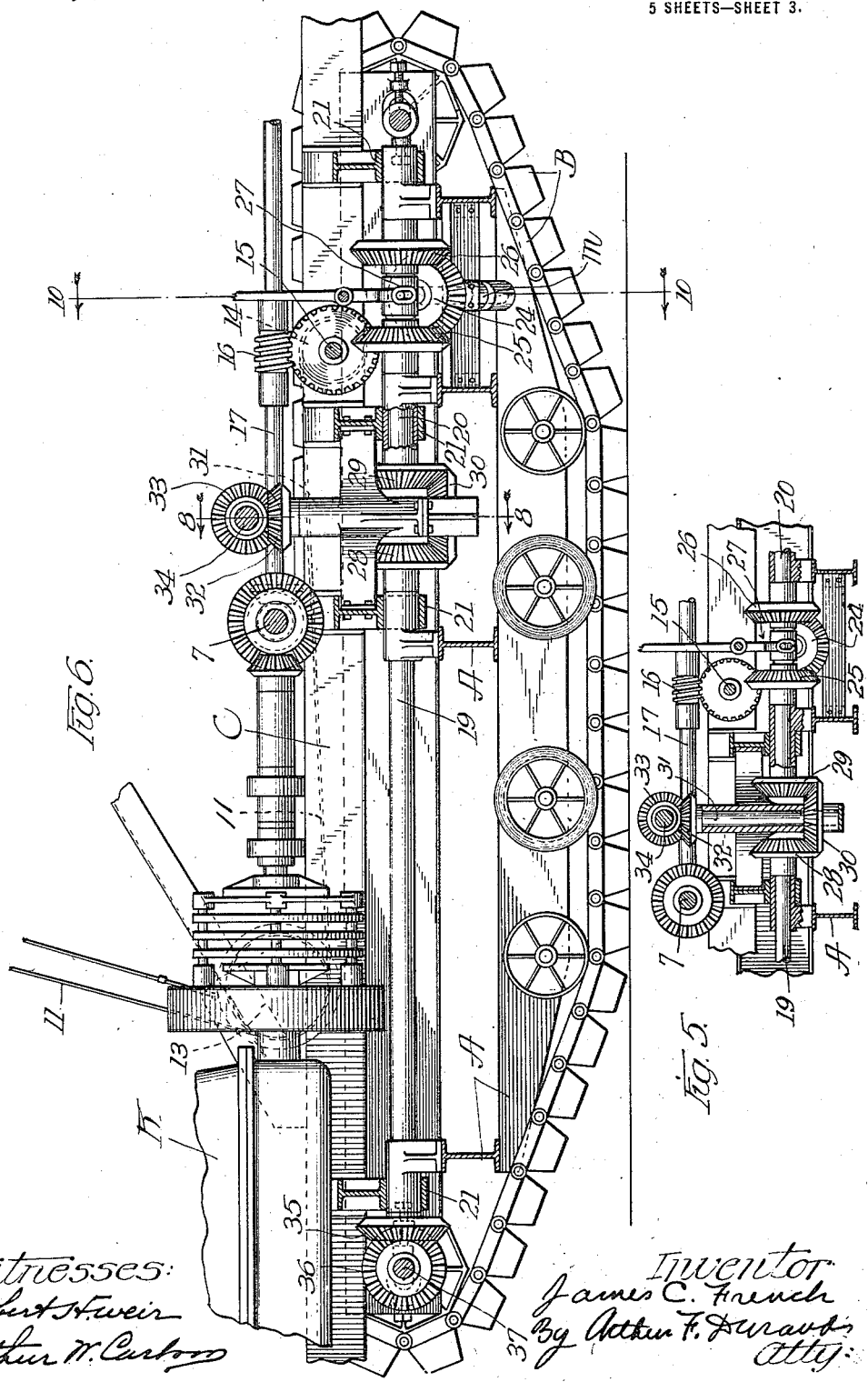

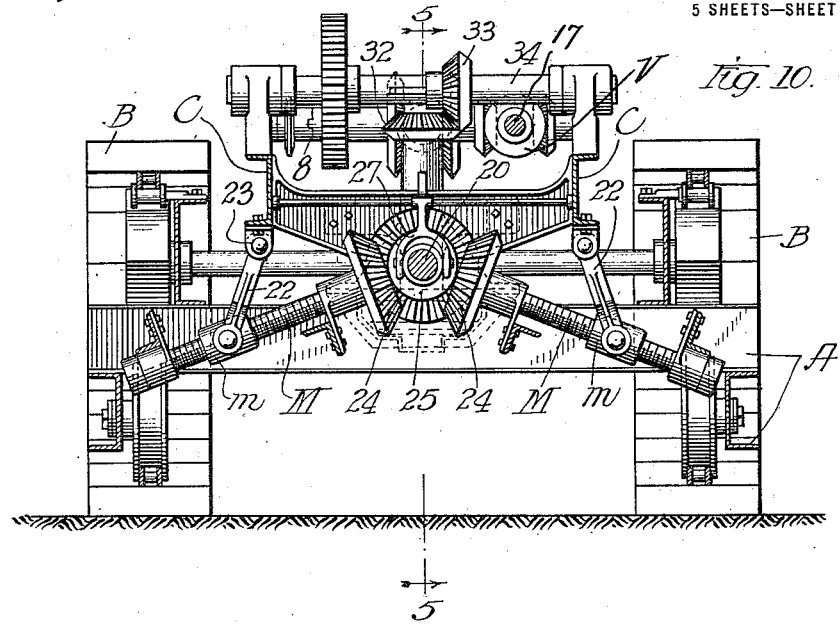
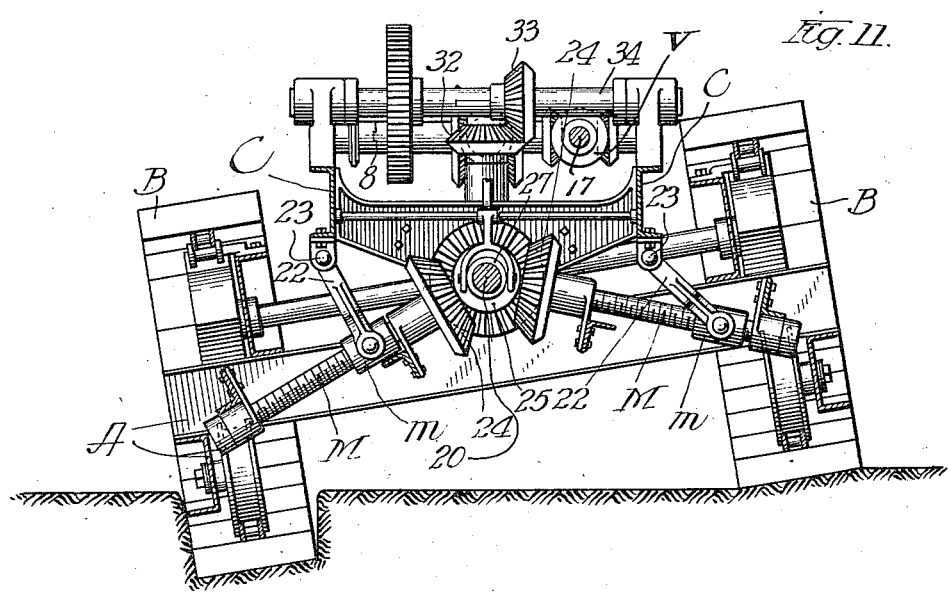

UNITED STATES PATENT OFFICE.

JAMES C. FRENCH, OF KENOSHA, WISCONSIN, ASSIGNOR TO FREDERICK C. AUSTIN, OF CHICAGO, ILLINOIS.

TRENCH-MACHINE.

1,285,108.  Specification of Letters Patent.  Patented Nov. 19, 1918.

Application filed August 23, 1915.  Serial No. 46,795.

*To all whom it may concern:*

Be it known that I, JAMES C. FRENCH, a citizen of the United States of America, and resident of 772 Grant St., Kenosha, Wisconsin, where I am now living and receive mail, have invented a certain new and useful Improvement in Trench-Machines, of which the following is a specification.

This is an improvement on the subject matter of my prior application Serial No. 16,303, filed March 22, 1915.

My invention relates to excavators in which the forward end of the body is provided with a support having an endless series of digging buckets for cutting a trench, and in which the body of the machine is provided with traction devices or other means for supporting the excavator on the bottom of the trench, whereby the machine travels forward below ground in the excavation formed by the buckets.

Generally stated, the object of my invention is to provide an improved and highly efficient excavator of this particular character.

A special object is to provide novel and improved means for more satisfactorily supporting the buckets than heretofore.

Another object is to provide an improved construction and arrangement whereby said buckets may be tilted or adjusted about a horizontal axis extending longitudinally of the machine, thereby insuring vertical sides for the trench, and enabling the operator of the machine to keep the bottom of the trench level, notwithstanding that the machine may settle occasionally at one side or the other, owing to soft ground and whereby the buckets as a whole may be maintained in proper working position, as will hereinafter more fully appear.

It is also an object to provide certain details and features of construction and combinations tending to increase the general efficiency and desirability of a trench cutting machine of this particular character.

To the foregoing and other useful ends my invention consists in matters hereinafter set forth and claimed.

In the accompanying drawings—

Figure 1 is a side elevation of a trench cutting machine embodying the principles of my invention.

Fig. 2 is a detail view of the shoe and vertically adjustable shield which are provided and arranged immediately in rear of the buckets at the bottom of the trench.

Fig. 3 is a plan of the machine shown in Fig. 1.

Fig. 4 is a cross sectional diagram of a trench cut by the said machine, showing the manner in which the excavated dirt is discharged a distance from the trench to form a spoil bank.

Fig. 5 is a longitudinal section of a portion of the machine on line 5—5 in Fig. 10, showing certain parts in elevation, and illustrating the mechanism and devices by which the caterpillars or traction devices are operated, and also the means and devices by which the upper platform or body of the machine may be tilted about a longitudinal axis to keep the sides of the trench vertical and the bottom level.

Fig. 6 is a detail section on line 6—6 in Fig. 3, showing one of the swivel bearings through which the power is transmitted to drive the caterpillar traction devices, and which form the longitudinal axis of adjustment or tilting movement for said body.

Fig. 7 is a plan view of the construction shown in Fig. 5, with certain portions thereof in horizontal section, and with other parts omitted for convenience of illustration.

Fig. 8 is a detail vertical transverse section on line 8—8 in Fig. 6.

Fig. 9 is a detail section on line 9—9 in Fig. 3.

Fig. 10 is a cross section on line 10—10 in Fig. 6, showing the caterpillar traction devices traveling on a level surface.

Fig. 11 is a similar view showing one caterpillar traction device below the level of the other, and illustrating the manner in which the platform or upper body of the machine is then tilted to one side to keep it level.

As thus illustrated, my invention comprises a truck body A provided with caterpillar traction devices B of any suitable or known character. A platform or upper supporting body C of the machine is carried by the said truck A, and is provided at its forward end with an upright frame D of any suitable construction. The support E is mounted on the horizontal shaft $e$ supported in suitable bearings on the upper end of the frame D, and comprises a pair of beams which are spaced apart and arranged horizontally at opposite sides of said frame.

The support E also comprises the vertical beams or members 1 and the inclined beams 2 which are suitably carried on the under sides of the parallel beams which are mounted on the shaft $e$, whereby a triangular frame is provided, having horizontal shafts F, G and H mounted at the three corners of the triangle. (See Fig. 1.) These shafts are provided with sprocket wheels or other suitable rotary elements for engaging the sprocket chains $h$, four of these chains being employed and spaced apart in the manner shown in Fig. 3. With this arrangement there are three endless series of digging buckets I on said sprocket chains, said buckets being each rigidly secured to opposite links of two of said chains. Each bucket has a path of travel, it will be seen, comprising a portion which extends upward and forward where the buckets are cutting forward and filling, a portion which then extends horizontally and rearward above shafts F and G, a portion which then extends vertically and downward toward the bottom of the trench. With this arrangement, the buckets travel downward and begin filling as they pass under the sprockets or other supporting elements on the shaft H, and continue to cut into the breast of the excavation while they are moving upward. As the buckets then pass around and over the shaft G they discharge their loads on to the transversely extending conveyer $g$, which latter may be of any suitable character, and whereby the excavated dirt is discharged on to the outwardly and rearwardly extending conveyer J, thus forming a spoil bank some distance from the trench cut by the continuous operation of the buckets while the machine is moving slowly forward in the trench. The conveyer $g$ is driven by gearing W on one end of the shaft G and by a sprocket chain $w$ leading from this gearing to the outer end of said conveyer. Also, it will be seen, the conveyer J is driven by gearing X on one end of the shaft $e$, and by a sprocket chain connection $x$ leading from this gearing to the adjacent end of said conveyer. Aprons or guard plates 3 and 4 are disposed above and at opposite sides of the conveyer $g$, thereby preventing the dirt from falling over the side edges of said conveyer. Sprocket chains $h$ are driven through the medium of a sprocket chain connection 5 extending from the shaft $e$ to the shaft G and through the medium of another sprocket connection 6 extending from shaft $e$ to the shaft 7 which is supported transversely on the body C at a point over the traction truck. An engine K, of any suitable form or character, is mounted on the rear portion of the body C, and is connected by a clutch mechanism $k$ and a set of bevel gears with the shaft 7, whereby this shaft may be rotated in either direction without reversing the engine, and a clutch 8 being provided for connecting one of said bevel gears with the sprocket connection 6, thereby providing means for driving the buckets I from the said engine. Sheaves 9 are mounted on the arms 10 of the support E, these arms extending rearward in the horizontal plane of the shaft $e$, whereby the said shafts are over the portion of the body immediately in front of the engine. Cables 11, one on each side of the machine, are arranged over said sheaves 9, and at one end, these cables are connected at 12 to the body of the machine. These cables extend over the sheaves 9 and then downward and around the sheaves 13 on the body frame and then forward to a point where they are wound upon the drums 14 on the transverse shaft 15 carried in suitable bearings on the body. This shaft 15 is connected by a worm gearing 16 with the longitudinal shaft 17, which latter is connected by suitable gearing and clutch mechanism V with the transverse shaft 7, whereby this shaft 17 can be rotated in either direction by the power transmitted from the engine. In this way, and by operating the cables 11 upon their winding drums 14, the support E can be tilted about the horizontal axis provided by the shaft $e$, thereby raising and lowering the buckets.

A shoe L is arranged to slide on the bottom of the trench immediately in rear of the buckets, and is provided at its front end with a shield $l$ in the form of a sheet metal plate which extends across the trench and slides up and down on the frame D when the said shoe is raised and lowered. For this purpose a vertical shaft 18 has a screw connection with the shoe L, whereby rotation of this shaft will raise and lower the shoe, and the upper end of this shaft is connected by gearing and clutch mechanism V with the longitudinal shaft 17 in any suitable or desired manner. With this arrangement, and by operating shaft 17 one way or the other, the shoe L and shield $l$ can be adjusted up and down to suit the requirements. A machine of this kind, it will be seen, is designed to travel on the bottom of the trench cut by the buckets, and with the construction shown the entire machine is below the top of the spoil bank. When soft ground is encountered, the caterpillar traction devices B will tend to sink or settle more or less. and if one caterpillar settles below the level of the other the buckets will then fail to operate in the proper manner—that is to say, the sides of the trench will not be vertical and the bottom will not be level. With the construction shown, however, this difficulty is obviated by tilting the body C about a longitudinal axis formed by the longitudinal shafts 19 and 20, these two shafts being disposed end to end and exactly in line with each other and mounted in suitable bearings on the truck frame or body A. For the purpose of enabling the body C to tilt sidewise on the shafts 19 and 20, swivel bearings or collars 21 are provided on said shafts and suitably connected with the body C, whereby the latter may tilt to either side. Any suitable mechanism can be employed for tilting the body C about the longitudinal axis thus provided, and as a matter of further and special improvement jack-screws M are mounted in inclined position on the truck frame A, transversely thereof, and are provided with threaded sleeves m connected by links 22 with pivot bearings 23 supported on the sides of the body frame C, it being observed that the latter is somewhat narrower than the truck frame and is disposed between the two caterpillars. (See Figs. 10 and 11.) The inner end of each screw is provided with a bevel gear 24, and these two bevel gears are arranged to engage similar bevel gears 25 and 26 loosely mounted on the shaft 20, a clutch 27 of any suitable character being employed for alternately connecting the gears 25 and 26 with said shaft. Thus, and by operating clutch 27, the jack-screws M can be rotated by either one of the gears 25 and 26, thereby causing the threaded sleeves m to move along the screws M in the desired directions. This, through the medium of the toggle joints provided by the links 22, will cause the body C to tilt one way or the other until it stands level, thus insuring the desired operation of the buckets.

The shafts 19 and 20 are driven in opposite directions through the medium of the bevel gears 28 and 29 secured thereto, which gears engage a similar bevel 30 on the lower end of a vertical shaft 31 mounted in suitable bearings on the framing of the body C. The upper end of this shaft 31 has a bevel pinion 32 which engages a similar pinion or bevel gear 33 on the horizontal shaft 34, the latter being mounted in suitable bearings on the top of the body C and the gear 33 being preferably splined on its shaft to permit opening and closing of the power transmitting connection thus provided. The shaft 34 is suitably geared to the shaft 7, whereby the shafts 19 and 20 are driven by the engine. The rear end of the shaft 19 is provided with a bevel gear 35 which engages a similar gear 36 on the transverse shaft 37 which carries the driving sprockets for the link belts which constitute the treads of the two caterpillars. In this way, it will be seen, the body C tilts about the shafts 19 and 20, and at the same time shaft 19 is employed for driving the caterpillars, while shaft 20 is employed for operating jack-screws by which the upper body of the machine is tilted to one side or the other to keep the buckets operating in the proper manner.

The conveyer g is driven from the shaft G through the medium of any suitable power transmitting connection, and the conveyer J is driven from the shaft e through the medium of any suitable power transmitting connection. Thus the buckets cut a straight trench, as the machine slowly moves forward, and the conveyers then discharge the excavated dirt at a distance from the side of the trench, forming a spoil bank, the top of which is above the top of the excavator. The shape of the trench is shown at X in Fig. 4, and the spoil bank is indicated at Y, whereby it will be seen that the sides of the trench are vertical and the bottom horizontal. A machine of this kind, it will be readily seen, can be used for various purposes. For example, it can be employed for making trenches for drainage purposes, or it may be used for making trenches for military purposes. Also, it may be employed for loading wagons, inasmuch as the wagons or dump cars can be brought below the outer end of the conveyer J and receive the discharge.

With the foregoing construction, it will be seen that the transverse axis provided by the shaft e is above the traction means, and also above the top of the ground, and is between the ends of the longitudinally disposed tilting member upon the overhanging end of which the trench-cutter formed by the endless series of buckets is mounted. While the sides of this tilting member or frame overhang the sides of the trench, still the arrangement is such that practically the entire machine travels in the trench, with only the extreme upper portions thereof extending above ground.

With further reference to the relative arrangement of the parts, it will be seen that the transverse tilting axis e is directly over the front end of the excavator body, and that the buckets I are always in front of this axis, throughout their endless path of travel. Also, the adjusting means, including the cable 11, are in rear of said axis e, and with the arrangement shown the lower end of the trench-cutter formed by said buckets is free and hangs down in the trench ahead of the traction means. The scraper L, however, slides ahead of the traction means, immediately behind the trench-cutter, and in this way the trench-cutter and the scraper co-operate to form a smooth floor upon which the traction means can travel. The longitudinal axis of adjustment formed by the shaft 19, enables the scraper to keep the bottom of the trench level, and enables the trench-cutter to keep the sides of the trench vertical.

What I claim as my invention is:

1. In a trenching machine, the combination of a body provided with traction means adapted to travel on the bottom of the trench, an upright support at the front end of said body, a transverse shaft on the upper end of said upright support, a longitudinally disposed tilting member mounted on the upper end of said support to tilt about an axis coincident with said shaft, a transverse shaft supported on the forward end of said member, a frame depending from the forward portion of said member, an endless series of buckets extending around and operated by the shaft at the end of said member, rotary means at the lower end of said depending frame to guide said series of buckets, rotary means between said shafts to support said series of buckets, a power-transmitting-connection from one shaft to the other, a motor on said body, a power-transmitting-connection from said motor to the shaft which forms the axis of said tilting member, so that said buckets are operated upward in front of said frame and downward in rear thereof, a transverse conveyer below said tilting member to receive the excavated dirt from the upwardly moving buckets, and devices for pulling downward on the rear end of said tilting member to raise said buckets.

2. A structure as specified in claim 1, an oblique conveyer to receive the excavated dirt from said transverse conveyer, means to connect said transverse conveyer with said shaft at the end of the tilting member, and means to connect said oblique conveyer with said shaft which forms the axis of said tilting member.

3. A structure as specified in claim 1, and means to connect the outer end of said transverse conveyer with one end of said shaft at the outer end of said tilting member.

4. A structure as specified in claim 1, the front side of said depending frame being inclined forward and provided with rollers to press the buckets forward, and the rear side of said depending frame being vertically disposed, whereby said buckets travel downward vertically and upward at an angle, and a vertically adjustable shield carried by the body immediately in rear of said downwardly moving buckets, said shield having means to scrape the bottom of the trench.

5. In a trenching machine, the combination of a body provided with traction means adapted to travel on the bottom of the trench, whereby the entire machine is adapted to travel in the trench made thereby, a trench-cutter disposed at the forward end of said body, so that said traction means will travel on the level trench-floor made by said trench-cutter, means to provide a central longitudinal axis of tilting motion between said body and traction means, so that said trench-cutter can be tilted sidewise to keep the trench-floor horizontal between the two sides of the trench and to keep the sides of the trench vertical, mechanism for rocking said body and trench-cutter about said longitudinal axis, and means to control the operation of said mechanism at will.

6. A structure as specified in claim 5, and means rotatable about said longitudinal axis to transmit power through said axis for the operation of said traction means.

7. A structure as specified in claim 5, and means rotatable about said longitudinal axis to transmit power through said axis for the operation of said mechanism.

8. A structure as specified in claim 5, said traction means comprising a truck, said mechanism including screws rotatably mounted on said truck, threaded sleeves on said screws, pivoted links connecting said sleeves with said body, and means including gearing rotatable about said longitudinal axis to rotate said screws.

9. A structure as specified in claim 5, and gearing and clutches on said longitudinal axis to control the operation of said mechanism.

10. A structure as specified in claim 5, and two shafts arranged end to end and coincident with said longitudinal axis, means for connecting one shaft with said traction means, means for reversibly connecting said other shaft with said mechanism, and power-transmitting connections to rotate the two shafts in opposite directions.

11. A structure as specified in claim 5, said mechanism comprising screw devices connected by toggle-links with said body.

12. The combination of a body provided with traction means having a truck, means to provide a longitudinal axis of tilting motion for said body on said truck, rotatable screws on said truck, threaded sleeves on said screws, toggle-links connecting said sleeves with said body, and means including gearing coincident with said longitudinal axis to operate said screws.

13. A structure as specified in claim 12, and means including gearing rotatable about said longitudinal axis to operate said traction means.

14. A structure as specified in claim 12, and clutch mechanism on said longitudinal axis to reverse the rotation of said screws.

15. In a trenching machine, a body provided with traction means to travel on the ground, a trench-cutter disposed at the forward end of said body, means to provide a transverse axis of tilting motion for said trench-cutter, a motor on said body having power-transmitting-connection to said trench-cutter through the medium of gearing rotatable about said axis, a longitudinal shaft on said body, a transverse shaft provided with winding drums and connected by worm-gearing with said longitudinal shaft, sheaves on said body, over-head sheaves supported by means extending rearward from said trench-cutter, cables secured at their ends and extending around all of said sheaves and then forward to the drums on said transverse shaft, and means to reversibly connect said motor with said longitudinal shaft.

16. In a trenching machine, the combination of a body having traction means to travel on the bottom of the trench, a transverse axis at the forward end of said body, a longitudinally disposed tilting member mounted horizontally on said axis, an endless series of buckets supported by the outer end portion of said member in front of said axis to cut a trench in advance of said traction means, said buckets moving upward to cut the trench and then downward in front of said axis after discharging the dirt therefrom, so that the buckets are always in front of said axis, means to receive the excavated dirt from the buckets, said axis being disposed some distance above said traction means, a motor on the body, power-transmitting-connections operable about said axis between said motor and said buckets, and devices behind said axis to pull the other end of said member downward to raise said buckets, said series of buckets forming a trench-cutter which is connected at the top thereof with said power-transmitting-connections so that the trench-cutter formed by said buckets is supported at the upper end thereof and extends downward from said member.

17. A structure as specified in claim 16, said trench-cutter having its upper portion provided with two transverse axes of motion between which the buckets travel horizontally, and said means for receiving the excavated dirt from the buckets being disposed between these two axes of motion.

18. A structure as specified in claim 16, said tilting member being of a width and disposed at a height to overhang the sides of the trench.

19. In a trenching machine, the combination of a body having traction means to travel on the bottom of the trench, a depending trench-cutter disposed at the front end of said body and comprising an endless series of excavating and conveying buckets, means to support the upper end of said trench-cutter and to form a transverse axis of swinging motion therefor, so that the buckets are always in front of said axis, means to raise and lower said trench-cutter about said axis, a motor on the body, power-transmitting-connections operable about said axis between said motor and the upper end of said trench-cutter, idlers to guide the buckets around the lower end of the trench-cutter, and power-transmitting-connections from said motor to operate said traction means behind said trench-cutter.

20. A structure as specified in claim 5, and a scraper interposed between said traction means and said trench-cutter and supported to rock about said longitudinal axis in unison with said trench-cutter.

21. In an excavator for cutting a trench, the combination of a body having traction means adapted to travel on the bottom of the trench, means to provide a transverse axis over the front end of said body, a longitudinally disposed member supported horizontally on said axis, so that the front end of said member overhangs the trench and whereby the rear end of said member overhangs said body, means suspended from the front portion of said member to cut a trench in front of said traction means, devices applied to the rear end of said member to raise and lower said trench-cutting means, by tilting motion of said member about said transverse axis, said trench-cutting means operating entirely in front of said axis, a power-transmitting connection between said axis and the upper end of said trench-cutting means, a power-plant on said body, a power-transmitting connection from said power-plant to said axis, so that power is transmitted through said axis to operate said trench-cutting means, and a power-transmitting connection between said power-plant and said traction means.

22. A structure as specified in claim 21, and means operated by said trench-cutting means to discharge the excavated dirt laterally above ground.

Signed by me at Chicago, Cook county, Illinois, this 4th day of August 1915.

JAMES C. FRENCH.